2,629,070

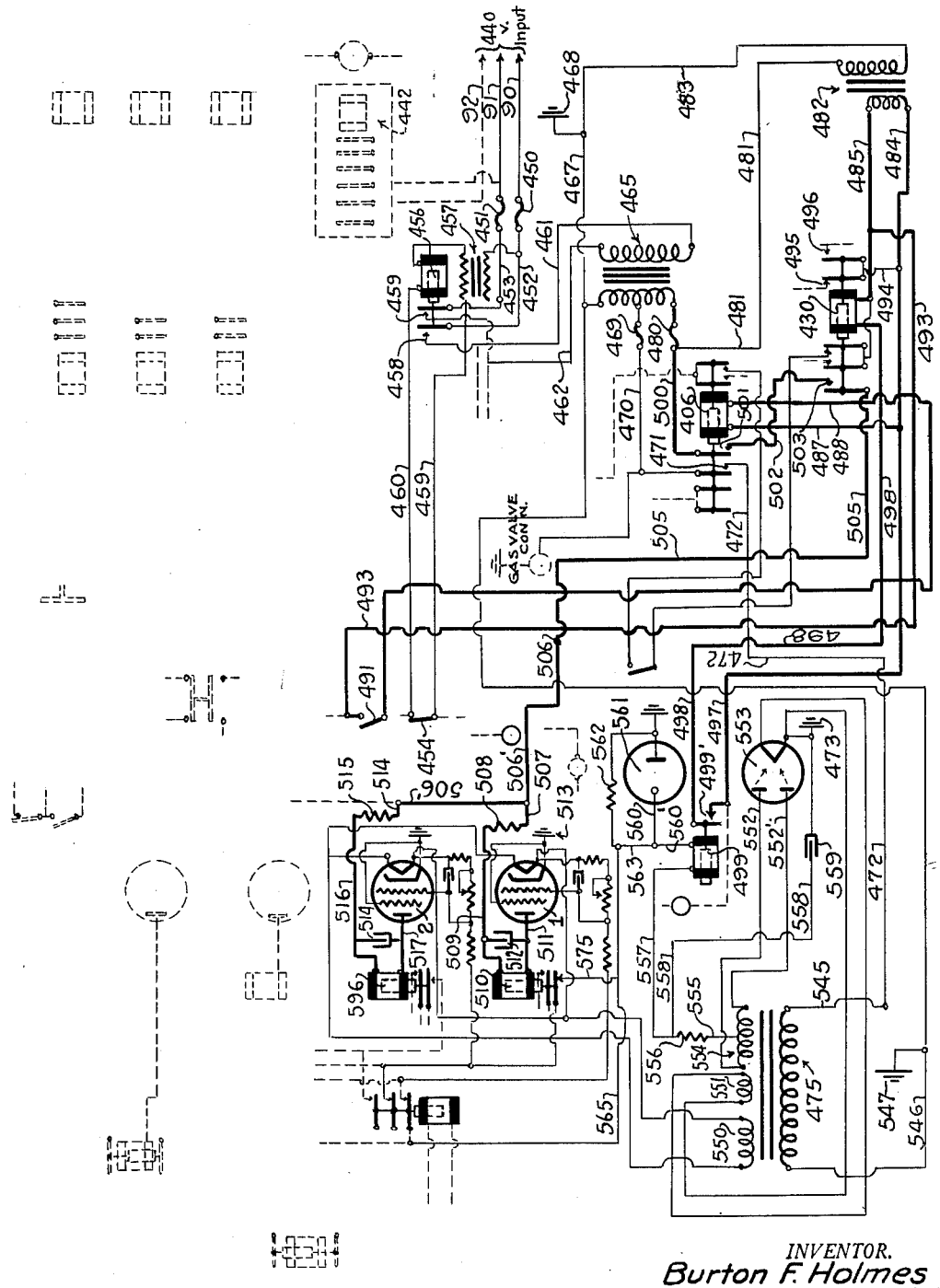
INVENTOR.
Burton F. Holmes
BY Herbert H. Heindel
Edmund B. Whitcomb
ATTORNEY Patented Feb. 17, 1953

UNITED STATES PATENT OFFICE 2,629,070

CONTROL CIRCUITS FOR SPACE DISCHARGE TUBE NETWORK

Burton F. Holmes and Herbert H. Heindel, Toledo, Ohio, assignors to Schultz Die Casting Company, Toledo, Ohio, a corporation of Ohio Original application December 10, 1947, Serial No. 790,838. Divided and this application November 21, 1950, Serial No. 196,762

12 Claims. (Cl. 315—102)

1

This application is a division of our previous application, Serial No. 790,838, filed December 10, 1947, for "Method of Die Casting."

The present invention relates to interconnected supply circuits for the bias, plate and other circuits of certain discharge tubes used to control the operation of a machine, an object of the invention being to provide a satisfactory economical electrical system for supplying current to said tubes and particularly including a current supply network for both plate and tube grid circuits from an input supply line of a relatively high voltage of alternating current to suitable transformers, circuits, control tubes, rectifiers and condensers to insure and supply the proper current for the plate circuits, heater circuits and particularly the bias circuits for the control grids of said discharge tubes.

A further feature of our invention is an interconnection between the plate and grid supply which is automatic in connection with said interaction and to also provide a preliminary warm-up period for said tubes to insure proper action, especially for machine operations.

Further objects and advantages are within the scope of this invention, such as relate to the arrangement, operation and function of the related elements involved, to various details of the connections and to combinations of electrical circuits and elements relating to a satisfactory operation of such network, as will be apparent from a consideration of the specification and drawing of a form of the invention, which may be preferred, in which the figure is an electrical circuit diagram of one embodiment of our invention.

The input for the electrical system referred to comprises a three-phase, alternating current circuit 440 volt supply line shown as having input leads 90, 91 and 92. For this present invention of the control supply circuits, we utilize the input on leads 90 and 91, which, passing through fuses 450 and 451, connect through leads 452 and 453 to the switch points 458 and 459 controlled by coil 456. We provide a 24 volt winding for the transformer which extends from the transformer 457 to the coil 456 and is utilized for the purpose of closing the switch points 458 and 459. Through switch 454 and leads 459 and 460, coil 456 is energized from said transformer.

The input circuit then extends by leads 461 and 462 to a main tapped transformer 465 which has a 440 volt primary and a 220 voltage secondary tapped at 110 volts to give another or third reduced circuit voltage of 110 volts. A circuit ground lead 467 is grounded at 468.

2

We provide a 220 volt circuit from said main transformer 465 (said circuit to be hereinafter further described), for the purpose of supplying (through transformers), current to the plates of certain thyratron tubes 1, 2, etc., of the machine controlling electrical system.

Thus, we provide a 110 voltage circuit from main transformer 465 (said circuits to be hereinafter further described), to supply a transformer 475 for lighting the filaments of tubes 1, 2, etc., at 6.3 volts and another circuit for the heating elements hereinafter also described. We also provide 5 volts for a rectifier tube and a high voltage for the plate of the same to supply D. C. current to the grid bias circuits for the main thyratron tubes 1, 2, etc. To this end, the 110 volt circuit from main transformer 465 includes fuse 469, lead 470 to normally open point 471, lead 472 to lead 545, the 110 volt primary of transformer 475. It will be noted that transformer 475 is grounded at 547 through lead 546 and, as stated above, transformer 465 is grounded at 468 so that the return ground circuit is thereby established.

Referring now to the above-mentioned 220 volt circuit from transformer 465, the same includes fuse 480, lead 481 to primary of another transformer 482. The other side of the primary of said transformer 482 is grounded at 468 by lead 483. This transformer 482 has a 24 volt secondary winding with lead 484 which, by lead 487, passes through a coil 486, the other side of coil 486 having lead 488 connected to switch 491 (normally open). The return circuit includes lead 493, and lead 485 to other side of the 24 volt transformer 482. Thus, when switch 491 in this circuit is closed, coil 486 is energized and this closes switches to effect an application of voltage to the system for automatic operation of the machine. Therefore, switch 491 is a key switch by means of which the mechanism may be disconnected from all automatic operation and, in certain instances, the machine may be operated manually.

This 24 volt control circuit also connects through lead 484, lead 494, to both points 495 and 496 of relay 430.

Relay 430 is located in an arrangement of circuits provided to give a delaying action to the application of the 220 volts to the plates of the main network thyratron tubes such as 1 and 2 to allow said tubes to warm up. This delay action is accomplished by a mercury time delay mechanism 499, 499' and the connections are controlled by relay 430. Thus, this 24 volt circuit is connected from transformer 482 by lead 484 to lead 497 through point 499' of the combined choke coil and relay 499 and back by lead 498 to the coil of relay 430. The coil 430 is connected on the other side by lead 485 to transformer 482.

Each of the plate circuits for the tubes are connected to ground terminal 468 from the main transformer 465, since each cathode circuit is grounded as shown. On the other side from said transformer 465, the plate circuits include the fuse 480, lead 500 to normally open point 501 on relay 406, which point is closed in the automatic position of the apparatus. From point 501 we provide lead 502 to normally open point 503 on relay 430, which point is also closed in the automatic machine position but only after the time delay for the tube warm-up has taken place hereinafter described. Lead 505 from point 503 connects with lead 506 and all the tube plate circuits connect to wire 506. Thus, for the plate circuit of tube 1, we have a lead 507 connected from lead 506 to resistor 508 to limit the current flow, lead 509 to coil 510 and lead 511 to the plate of tube 1. The cathode circuit of tube 1 is grounded as indicated by a circuit 513 and, hence completes the circuit to the main transformer 465 since the latter is grounded at 468, as stated supra. We also have a condenser 512 connected across coil 510 to supply current to the relay coil 510 on the negative one-half cycle and prevent chattering of the points controlled by relay 510.

The other tubes 2, etc., are similarly connected.

Thus, for tube 2, lead 514 is connected to the lead 506 common to all of tubes 1, 2, etc. Lead 514 connects through resistor 515, lead 516 to coil 496, hence, by a lead 517 to the plate of tube 2 as shown. A condenser 514 (similar to condenser 512), is connected across leads 516 and 517 for coil 596 as shown.

In the embodiment of our invention illustrated in the accompanying drawing, as indicated supra, we provide circuit arrangements so that before the machine can be operated there is a warm-up time for the several thyratron tubes and also an interconnection so that if the bias should fail, due to abnormal conditions, such failure opens the main plate circuits of the several tubes so that they would not discharge, as otherwise this would cause an improper operation of the die casting machine.

To this end, the transformer 475 is supplied with 110 volts from the main transformer 465 which passes through relay 406 and connects by lead 472 which is connected by lead 545 to the primary of the control transformer 475 as referred to supra.

The transformer 475 has three secondaries. One secondary 550 of 6.3 volts is for the heater elements of the thyratron tubes 1, 2, etc.

The next secondary from transformer 475 provides a 5 volt circuit 551 for heating the filaments of the rectifier tube 553.

The third secondary from transformer 475 constitutes a source for supplying the bias for the several thyratron tubes 1, 2, etc. The current for the bias is changed from alternating current to D. C. and, to this end, we provide rectifier tube 553 connected by leads 552 and 552' joined on the outside terminals of winding 554 of transformer 475 and to the plates of rectifier tube 553 as shown. The cathode of rectifier tube 553 is grounded as shown at 473. Parallel to the plate cathode circuit of rectifier tube 553 is a condenser circuit 558 having a filter condenser 559 located therein. We also provide in the grid circuit for the main thyratron tubes a voltage regulator tube 561 grounded as shown so that the D. C. current from the rectifier tube 553 is supplied to the plate of regulator tube 561 as indicated. The outlet terminal of regulator tube 561 is connected by lead 569 to lead 563, lead 555 which is the main bias supply lead for the thyratron tubes 1, 2, etc. We also provide a bleeding resistor 562 in a circuit parallel to the regulating tube 561 as shown, connected with the bias supply lead 565.

The relay and controlling coil 499 is connected by a lead 560' to the output lead 560 of the regulating tube 561, said coil 499 being also connected by lead 557 through resistor 556 to the center of winding 554 which places coil 499 in series with the grid circuit for the thyratron tubes 1 and 2.

From this description and particularly the drawing showing the bias supply circuits, it will be seen that the alternating current supplied from winding 554 on the transformer 475 is connected to the rectifier tube 553 producing pulsating direct current, and pulsations of which are compensated for by the condenser 559 in conjunction with resistors 556 and 562, the D. C. current being grounded from the rectifier tube 553 at 473 and, hence, through the ground for regulating tube 561, is connected by lead 560 and lead 563 to the bias circuit 565 for the main thyratron tubes 1, 2, etc.

Lead 560' from lead 560 passes through coil 499, lead 557, resistance 556 to the center of said third secondary winding 554 which, being connected with both leads 552 and 552', passes therethrough to ground through one or the other of leads 552 or 552' dependent upon the particular point of the cycle at which the connection is taking place. Thus, the coil 499 is in parallel with the grid supply circuit 565 so that unless an adequate grid supply circuit is being produced by the system, coil 499 will be deenergized. The coil 499 which, being in parallel with the bias circuit, as shown in the drawing, is also arranged to act as a combined choke or further regulating resistor as well as a relay, the point 499' of which is of any type of slow making and quick breaking.

The switch 499' of coil 499 is, as stated above, in the supply circuit for the plate voltage of the several thyratron tubes 1, 2, etc., so that upon energizing relay 499, the slow closing of the plate circuit through switch point 499' gives the tubes 1, 2, etc., a chance to warm up in their internal circuits before the plate voltage supply can be connected to said tubes. Moreover, as stated supra, if there is any failure in the bias supply for the tubes 1, 2, etc., since current through relay coil 499 would also fail and this coil 499 must be energized to close switch 499' in the plate circuits of the tubes, failure of the bias circuit opens the relay point 499' and, hence, disconnects the plate supply circuits to tubes 1, 2, etc.

It is apparent that, within the scope of the invention, modifications and different arrangements may be made other than is herein disclosed, and the present disclosure is illustrative merely, the invention comprehending all variations thereof.

What we claim is:

1. In the supply circuits for discharge tubes having plate circuits and control grid bias circuits, the combination of an alternating current input supply; a main transformer to reduce the voltage for supplying electrical energy to the circuits of said tubes; a second transformer connected to said main transformer; connecting circuits from said second transformer for said plate circuit; a switch for controlling said plate circuit; a third transformer connected with said main transformer; circuits from said third transformer for supplying voltage to said bias circuits; a plurality of secondary windings on said last-mentioned transformer, a rectifier tube; connections from said windings to the elements of said rectifier tube, said rectifier tube being connected in said bias circuit; a coil; circuits and connections whereby said coil controls said switch in said plate circuit operative to close said switch upon normal voltage of said bias circuit; and interlocked connecting relays for establishing said plate circuit.

2. In the supply circuits for discharge tubes having plate circuits and control grid bias circuits, the combination of an alternating current input supply; a main transformer to reduce the voltage for supplying electrical energy to the circuits of said tubes; a second transformer connected to said main transformer; connections from said second transformer to said plate circuit including a controlling circuit; a switch in said controlling circuit; a third transformer connected with said main transformer; circuits from said third transformer for supplying voltage to said bias circuits; a secondary winding on said last-mentioned transformer, a rectifier tube; connections from said winding to the plates of said rectifier tube; a filter condenser interposed between the negative lead connections and the positive lead connections of said bias circuit; and means adapted to open said switch in said plate controlling circuit upon failure of said filter condenser.

3. In combination, discharge tubes each having a cathode and a plate; circuits therefor; a control grid bias circuit for said tube; ground connections for the cathodes of said tubes, a source of alternating current input supply; a main transformer to reduce the voltage for supplying electrical energy to the circuits of said tubes; a second transformer connected to said main transformer; connections from said second transformer to said plate circuit; a switch in said circuit; a controlling circuit connected with said switch; a switch in said controlling circuit; a third transformer connected with said main transformer; circuits from said third transformer for supplying voltage to said bias circuits; a combined relay and choke coil in said bias circuits for operating said controlling circuit switch; a plurality of secondary windings on said last-mentioned transformer, a rectifier tube; connections from said windings to the plates of said rectifier tube; connections from one of said secondary windings to the cathode of said rectifier tube; and a ground for said rectifier cathode, said rectifier tube being connected in said bias circuit.

4. An interconnected plate circuit and grid circuit control system for discharge tubes including a switch in the plate current supply circuits for said tubes; a bias supply for the controlling grids of said tubes, said supply including a source of alternating current; a transformer and a rectifier tube, said rectifier tube connected with the terminals of a secondary winding of said transformer; a regulating tube; a lead between said rectifier tube and said regulating tube; an outlet lead from said regulating tube connected with said bias supply circuit for the grid of said tubes, a relay and controlling coil, a lead from said outlet lead to said controlling coil; a lead from said controlling coil to the center of said secondary winding on said transformer; a resistor in said last-mentioned circuit, a filter condenser connected between said controlling coil-transformer lead and the cathode of the rectifier tube and to said connection between said rectifier tube and said regulating tube; and means whereby said controlling coil operates said switch in one of said plate supply circuits so that upon failure of bias supply to said bias circuit, said plate circuit controlling switch is opened.

5. An interconnected plate circuit and grid circuit control system for discharge tubes including a switch in the plate current supply circuits for said tubes; a bias supply for the controlling grids of said tubes, said supply including a source of alternating current; a transformer and a rectifier tube, said rectifier tube connected with the terminals of a secondary winding of said transformer; a regulating tube; connections between said rectifier tube and said regulating tube, an outlet lead from said regulating tube connected with said bias supply circuit for the grid of said tubes, a resistor in parallel with said regulating tube and located between said rectifier and said grid supply circuit, a relay and controlling coil, a lead from said regulating tube outlet to said controlling coil; a lead from said controlling coil to the center of said secondary winding on said transformer; a resistor in said last-mentioned circuit, a filter condenser connected between said controlling coil-transformer lead and the cathode of the rectifier tube and to said connection between said rectifier tube and said regulating tube; and means whereby said controlling coil operates said switch to control the supply of current to said plate circuit so that upon failure of bias to supply to said bias circuit, said plate circuit switch is opened.

6. In an electrical controlling network for supplying plate current and bias voltage to the control grid of discharge tube, the combination of a source of current supply; a transformer; plate circuits connected with said transformer, said circuits including a controlling switch for effecting a supply of current to said plate circuits from said current supply; an additional transformer connected with said first-mentioned transformer; circuits from said additional transformer for supplying voltage to said bias circuits; a plurality of secondary windings on said last-mentioned transformer, a rectifier tube; connections from said windings to the plates of said rectifier tube; connections from one of said secondary windings to the cathode of said rectifier tube; connections from said tube to said bias circuits; a voltage regulating tube for said bias circuits; a resistance in parallel with said regulating tube; and a combined choke coil and relay for actuating said switch in said plate controlling circuit.

7. In an electrical controlling network for supplying plate current and bias voltage to the control grid of discharge tubes, the combination of a source of current supply; a transformer; plate circuits connected with said transformer, said circuits including a controlling switch for effecting the connection of said plate circuits with said current supply; an additional transformer adapted to be connected with said first-mentioned transformer; a rectifier tube; connections from said rectifier tube and said bias supply for said discharge tubes; connections from said additional transformer to the plates and cathode of said rectifier tube; and a filter condenser in parallel with said last-mentioned cathode circuit located between said additional transformer and said rectifier-bias supply connections.

8. In an interconnected network between the plate circuits and grid circuits of discharge tubes, the combination of a source of alternating current; circuit connections to supply current to the plate circuit of said tubes; a controlling switch for controlling said current supply; a transformer for supplying a predetermined voltage for the grid circuits of said tubes; a resistor in series in said grid circuits; a rectifying tube for changing alternating current to direct current for the grid circuits; a smoothing condenser connected in parallel with said grid circuits; a choke and relay coil for operating said controlling switch, said coil being in series with said grid circuits; a regulating tube in parallel with said grid circuits adapted to operate in conjunction with said resistor and choke coil; and means whereby said choke and relay coil operate said switch in the plate circuits of said discharge tubes.

9. In an interconnected network between the plate circuits and grid circuits of discharge tubes, the combination of a source of alternating current; circuit connections to supply current to the plate circuit of said tubes; a quick break and time delay making switch for controlling said current supply; a transformer for supplying a predetermined voltage for the grid circuits of said tubes; a resistor in series in said grid circuits; a rectifying tube for changing alternating current to direct current for the grid circuits; a smoothing condenser connected in parallel with said grid circuits; a choke and relay coil for operating said controlling switch, said coil being in series with said grid circuits; a regulating tube in parallel with said grid circuits adapted to operate in conjunction with said resistor and choke coil; and means whereby said choke and relay coil operate said switch in the plate circuits of said discharge tubes.

10. In a network of plate circuits and grid circuits for discharge tubes, the combination of a source of alternating current; means arranged to supply direct current to the grids of said tubes, said means including a rectifier tube adapted to be supplied with alternating current from said source and adapted to have electrical connections to the grids of said discharge tubes, said grid current supplying means including connections between said rectifier tube and said discharge tubes; a relay having its winding in series in said last-mentioned connections, the switching contacts of said relay adapted to effect the control of current of the plate circuits of said discharge tubes; a smoothing condenser in parallel with said rectifier and located across said rectifier-grid connections and between said alternating current source and relay to ground, said smoothing condenser adapted upon breakdown thereof to shunt said relay coil and open said plate circuits; and a resistor in said connections located between said rectifier tube and said relay coil to reduce current flow to said relay coil preventing energization of said coil upon failure of said smoothing condenser.

11. In an interconnected network between the plate circuits and grid circuits of a plurality of discharge tubes adapted to discharge in seriatim, the combination of a source of alternating current; circuit connections to supply alternating current to the plate circuits of said tubes, said connections including a single circuit for all said tubes for a portion of said circuit connections; a plate circuit switch in said single connection; a plurality of different control grid circuits for said tubes actuated to control the seriatim discharge thereof; means arranged to supply direct current for the grids of said tubes, said means including a rectifier tube connected with said alternating current source and adapted to have electrical connections with said grid circuits; a regulating tube in parallel in said electrical connections; a resistor in parallel with said regulating tube in said connections; relay means in said grid circuit connections adjacent said plate circuit switch; a smoothing condenser in parallel with said grid connections for a discharge tube; and means whereby said relay controls the operation of said plate circuit switch in said single plate circuit for supplying plate current to each of said tubes.

12. In an interconnected network between the plate circuits and grid circuits of a plurality of discharge tubes adapted to discharge in seriatim, the combination of a source of alternating current; circuit connections to supply alternating current to the plate circuits of said tubes; plate circuit switching means; a plurality of different control grid circuits for said tubes actuated to control the seriatim discharge thereof; a single grid supply circuit for connection to said plurality of different grid circuits; means arranged to supply direct current to the grids of said tubes, said means including a rectifier tube connected with said alternating current source and adapted to have an electrical connection with said single grid supply circuit; a regulating tube in parallel in said electrical connections; a resistor in parallel with said regulating tube in said connections; a relay in said single grid circuit connections for operating said plate circuit switching means; and means whereby said relay in said single grid circuit controls the operation of said plate circuit switching means for supplying current to all of said tubes independently of which grid circuit is connected to any one of the several discharge tubes.

BURTON F. HOLMES.
HERBERT H. HEINDEL.

REFERENCES CITED

The following references are of record in the file of this patent:

UNITED STATES PATENTS

| Number | Name | Date |
|---|---|---|
| 1,921,461 | Garstang | Aug. 8, 1933 |
| 1,954,680 | Morack | Apr. 10, 1934 |
| 2,147,449 | Lee | Feb. 14, 1939 |
| 2,402,472 | Usselman | June 18, 1946 |
| 2,457,112 | Abercrombie | Dec. 28, 1948 |